United States Patent [19]
Baum

[11] 3,818,966
[45] June 25, 1974

[54] HIGH DENSITY CARBIDE STUD

[75] Inventor: Charles S. Baum, Saint Clair, Mich.

[73] Assignee: Textron, Inc.

[22] Filed: June 5, 1972

[21] Appl. No.: 259,887

[52] U.S. Cl. .............................................. 152/210
[51] Int. Cl. ........................................... B60c 11/00
[58] Field of Search ................................... 152/210

[56] References Cited
UNITED STATES PATENTS
3,480,062  11/1969  Hillhouse ........................... 152/210
3,532,148  10/1970  Kolbl .................................. 152/210

FOREIGN PATENTS OR APPLICATIONS
429,613  9/1911  France ............................... 152/210

Primary Examiner—M. Henson Wood, Jr.
Assistant Examiner—D. W. Keen
Attorney, Agent, or Firm—Webb, Burden, Robinson & Webb

[57] ABSTRACT

A tire stud is formed by filling a tubular rivet, from its open end, with tungsten carbide grit of a relatively large particle size. After tamping and vibratory compacting of this grit the voids between the grit particles are filled with carbide grit of a substantially smaller particle size by vibratory techniques. The skeleton thus formed is filled with a molten matrixing metal and then cooled. The stud exhibits wear properties which approximate those of a rubber tire in which it embedded so that the end of the stud projects slightly beyond the tread surface of the tire during the life of the unit.

9 Claims, 3 Drawing Figures

PATENTED JUN 25 1974 3,818,966

HIGH DENSITY CARBIDE STUD

BACKGROUND OF THE INVENTION

1. Field of the Invention

This invention relates to tire studs consisting of hollow rivets filled with a dense body of tungsten carbide grit in a metallic matrix and to methods of making such studs.

2. Prior Art

Hard studs which are inserted into vehicle tires so that their free ends extend beyond the treads of the tires have proven useful in increasing the friction between the tires and icy or snow-covered roads so as to decrease the distance in which the vehicle can be stopped, decreasing the likelihood of skidding during turning and improving the starting traction to minimize the likelihood of the car becoming stuck in the snow or ice. In order to work effectively, these studs must project out from beyond the treads of the tires so that they regularly impact the road during use of the vehicle. Since this continual abrasion would quickly wear out a solid metal stud, the most popular studs in use today employ ceramics such as sintered tungsten carbide, which have an extremely high abrasion resistance in the form of a pin of sintered ceramic material supported within a tubular metal rivet.

The abrasion resistance of sintered carbide materials is so high that they tend to wear much more slowly than the tire in which they are embedded and thus project farther and farther beyond the tire surface as the tire wears. This projecting length creates several problems which have made studs the target of strong criticism and even restrictive legislative action in some areas. The most serious of these problems seems to be the excessive road wear caused by he long projection of studs from tires. While the wear caused by unstudded tires is almost unnoticeable so that the raods must be repaired because of the usual aging processes. Another problem caused by studs which extend too far beyond the tire surface is the reduction of wheel traction under certain circumstances on dry pavement. Tests have shown that on a dry pavement an excessively extending stud will tend to tilt and decrease the area of engagement between the wheel and the road so as to actually lower the frictional force between the two and increase stopping distance.

In order to obviate these problems caused by the disparity in the wear rate between the rubber tire and the stud or the stud insert, efforts have been made to provide studs which have wear rates which are somewhat commensate with the wear rate of the rubber tire so that the extension of the stud beyond the tire surface remains relatively constant during the life of the studded tire. One form of such stud is disclosed in my copending patent application Ser. No. 37,708 entitled "Tire Stud" which discloses a stud in the form of a hollow metal rivet filled with a tungsten carbide grit and supported in a softer metal matrix. The carbide particles are exposed and contact the road surface so as to provide the same traction as studs having sintered inserts. During use the softer matrixing material wears away as the result of abrasion with the pavement until an exposed segment of tungsten carbide grit may be knocked out of the matrix. This process shortens the stud.

SUMMARY OF THE PRESENT INVENTION

The present invention is addressed to a stud of the broad type disclosed in my previous patent application having a novel form of construction which provides important advantages over that stud and other prior art studs, and to a method of making this stud.

Broadly, my improved stud consists of a rivet having a tubular shank filled with sintered tungsten carbide grit particles of two distinct sizes: a first relatively large particle size grit and a second substantially smaller average size grit disposed in the voids between the relatively large grit particles. This combination of grits is supported in a matrix of a relatively soft, low melting temperature material.

Two important advantages are achieved by packing the rivet cavity with a relatively large size grit interspersed with the grit of the substantially smaller average size. First, a filling of maximum carbide density is thereby achieved. The density of the packing is directly related to the uniformity of the wear of the stud while in use. If a relatively low density filling is used, such as the filling of the type disclosed in my previous patent application, the stud will tend to wear much more quickly when the section exposed is primarily alloy. Thus the wear rate will be highly irregular. As the density of the grit in the stud increases, the proportion of tungsten which is exposed at any one time becomes more constant and the wear rate is more constant.

Another advantage which is achieved by use of the filling of two distinct grit particle sizes is control over the overall rate of wear. If the cavity were filled with particles of an extremely fine grit supported in a softer alloy matrix, the wear rate would be very high since the small tungsten carbide particles could easily be wrenched out of the grit by the forces imposed by contact with the road. If a uniform, relatively large particles size grit is employed, the overall wear rate substantially decreases. There is one average particle size for which the wear rate, on the average, will approximate that of the tire which is highly desirable. However, with this relatively uniform size grit, as has been noted, the instantaneous wear rate will be highly irregular. By balancing the relatively large size grit and a substantially smaller grit, the wear rate can be maintained relatively constant.

One of the factors contributing to the uniform wear rate realized with the stud of the present invention is the action of the relatively small grit to pack the larger grit particles within the tubular section and to effectively reinforce their bases. When the large particles are used without the smaller grit particles, as they begin to project from the stud the moments imposed against their retaining matrix due to the frictional force of contact with the pavement can rip the particles out causing spurts in the wear rate. When the bases of these larger projecting particles are packed with smaller particles a more uniform wear rate is achieved.

The present invention further contemplates a unique method of manufacturing the present studs. Broadly, this comprises packing the hollow section of a rivet with the relatively large grit and firmly settling that grit within the casing by tamping and vibration. After the container is filled with the larger grit, the finer grit is infiltrated into the voids in the particles by vibration. The compacted mass is then filled with a molten matrixing material and allowed to harden.

We have found that the ratio between the average size of the large grit particles and the average size of the small grit particles should exceed three to one in order to fully infiltrate the voids in the large particles with the smaller particles to create a stud having maximum grit density and accordingly most uniform wear.

Other objects, advantages and application of the present invention will be made apparent by the following detailed description of preferred embodiments of the stud and method of making it. The description makes reference to the accompanying drawings in which.

Figure 1:
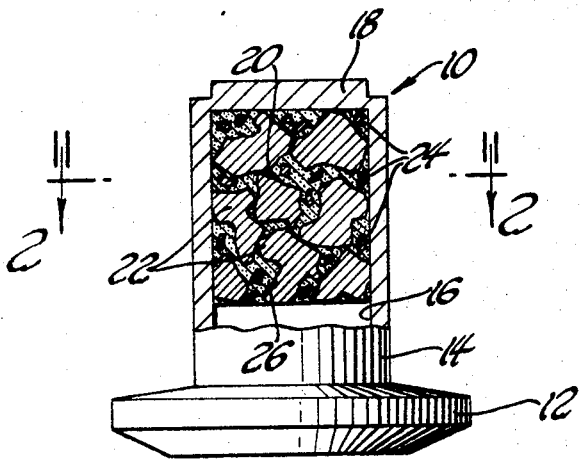
FIG. 1 is an elevational view of a preferred embodiment of a tire stud formed in accordance with the present invention partially broken away for the purposes of illustration.

The tire stud of FIG. 1, generally indicated at 10, is constructed about a steel body consisting of a head 12 and a tubular shank 14 which projects centrally from one side of the head. A central cavity 16 having a slightly smaller diameter than the shank 14 is formed through the head 12 and through the main section of the shank terminating just short of the far end of the shank so as to leave the steel body with a projecting end section 18.

About 60% of the cavity 16 at the end opposite to the head 12 is filled with a wear resistant composite material 20. The composite consists of a plurality of relatively large particles of sintered tungsten carbide grit 24 disposed in a matrix of a metal having a melting temperature substantially below that of the sintered tungsten carbide or the metal.

A typical stud formed in accordance with this invention may have an outer diameter of approximately 0.2 inches and a cavity diameter of 0.16 inches so that the side walls are 0.02 inches in thickness. The relatively large tungsten carbide grit particles 22 may be 8/16 mesh. That is, grit which will pass through a rectangular screen having openings of 0.0937 inches but will not pass through a screen having openings of 0.0469 inches. Thus, the typical large grit particle 22 has a large dimension of approximately half the diameter of the cavity 16. The relatively small particles 24 may be minus 100 mesh. That is, grit which will pass through a screen having a rectangular dimension of 0.0059 inches. Thus, the large grit has an average dimension of approximately ten times the smaller grit.

Another grit formula which has been found to work in practice is large grit 22 of 4/20 mesh (0.0331/0.1870 inches) and a fine grit 24 of minus 50 mesh (less than 0.0117 inches). In this combination the average particle size of the large grit exceeds that of the smaller grit i the approximate ratio of three to one.

The grit used in studs of the present invention is preferably formed of sintered tungsten carbide with a cobalt binder. This material may be manufactured by sintering tungsten carbide bodies in a conventional manner and then crushing these bodies or alternatively by crushing scrap sintered tungsten carbide as is obtainable from worn cutting tools and the like. Tungsten carbide grit in both forms and in a wide range of mesh sizes is commercially available.

The matrixing metal 26 is preferably a copper-nickel alloy although pure copper or nickel may be employed.

In use, the stud is inserted within a tire by conventional means so that the head 12 is disposed within the tire body and the steel end wall 18 projects from the tread of the tire.

Tire studs formed in accordance with both of the above formulations have been tested and found to have exhibited a wear rate within 10 percent of the tread-wear rate of conventional rear tires. By contrast, tire studs containing one-pieces sintered carbide inserts were found to wear at approximately 50% of the rate of the tires in the same test.

Other tests have shown that the rate of road wear from studded tires is proportional to the protrusion of the stud beyond the tire tread, but the traction afforded on icy or snow-covered pavements is relatively independent of the stud protrusion from the tire surface as long as there is sufficient protrusion to insure that the stud engages the pavement. A stud protrusion of approximately 0.020 inches will provide the same traction as a stud protrusion of 0.050 inches and even more traction than a projection of 0.100 inches. An excessively projecting stud will tend to tilt out of its cavity within the tire under the force of road impact and contact the road on its relatively smooth metal side, decreasing the traction to a point possibly even lower than that of the traction provided by an unstudded tire.

Accordingly, studs formed in accordance with the present invention by virtue of having a wear rate which closely approximates that of the tire will greatly minimize the problem of road wear without sacrificing the traction properties of the stud.

Figure 2:
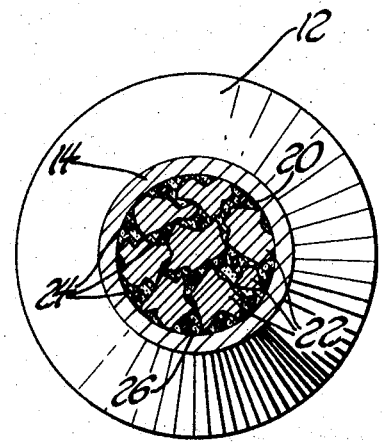
FIG. 2 is a sectional view of the tire stud of FIG. 1 taken along line 2—2 of FIG. 1.
Figure 3:
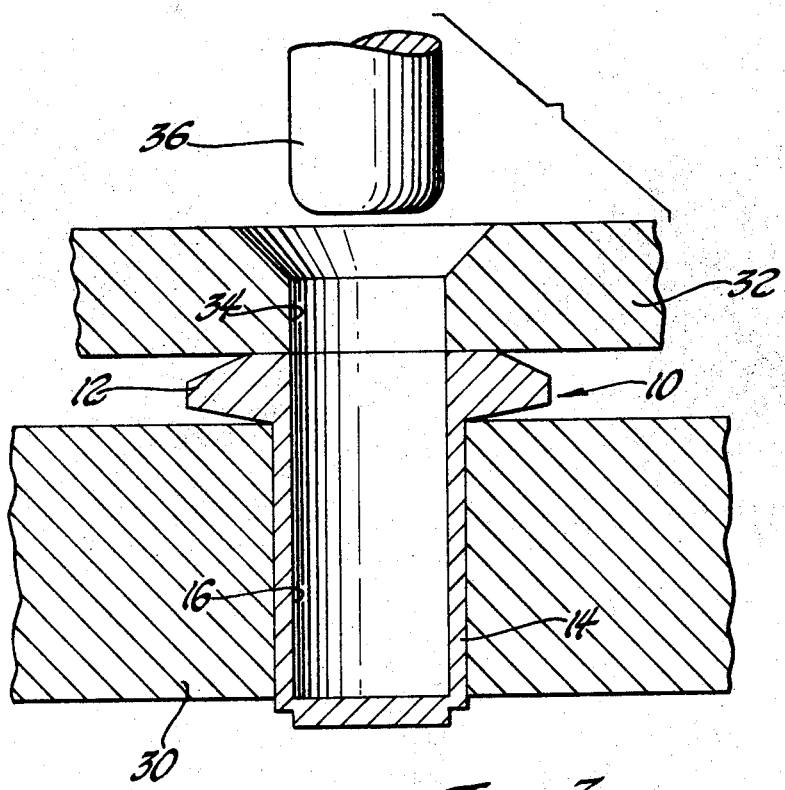
FIG. 3 is an elevational view of apparatus useful in forming tire studs in accordance with the method of the present invention.

The apparatus used in connection with the manufacture of the tire stud of the type illustrated in FIGS. 1 and 2 is illustrated schematically in FIG. 3. A stud 10 has its shank 14 supported within a cavity in a holding fixture 30. The head 12 of the stud casing rests on the top of the fixture 30 so that the open end of the cavity extends upwardly. A loading fixture 32 having a central cavity 34 of the same diameter as cavity 16 is brought into contact with the head 12 so that the cavity 34 is in line with the cavity 16. A load of relatively coarse grit 22 is then poured into the funnel-shaped upper end of the loading fixture 32 so as to fill the cavity 16 to approximately the 60 percent height. An elongated tamping fixture 36 then extends into the cavity 16 through the cavity 64 so as to tamp the relatively heavy grit. The stud may simultaneously be vibrated through the fixture 30 to firmly pack the grit 22.

The tamper 36 is then removed and a measured quantity of the finger grit 24 is poured into the cavity 16 through the cavity 34. This grit is again tamped and vibrated until it infiltrates the voids which exist between the particles 22. The average size of the grit particles 24 is less than the average size of the voids between the particles 22 so that the total volume of the mass is not increased when the finger grit is vibrated and tamped in.

Lastly, the matrixing metal may be inserted in powdered form to a height above that of the free surface of the grit. The stud may be passed through a brazing furnace which heats the powdered metal to its melting point and solidly fills all of the voids in the grit skeleton.

Alternatively molten metal may simply be poured into the voids.

Having thus described my invention, I claim:

1. A tire stud including a tube filled with a uniform dispersion of a plurality of irregularly shaped particles of sintered tungsten carbide of a relatively large average size, and a uniform dispersion of a plurality of irregularly shaped particles of sintered tungsten carbide of a substantially smaller average size disposed within a matrix of a material having a lower melting point than said tube or said tungsten carbide.

2. The tire stud of claim 1 wherein the relatively large average size particles are uniformly dispersed in the tube and the substantially smaller average size particles are dispersed within the voides created between the relatively large particles.

3. The tire stud of claim 1 wherein the relatively large average size particles fill the tube and the substantially smaller average size particles are dispersed within the voids between the relatively large average size particles.

4. The tire stud of claim 1 wherein the tube is closed at one end and open at the other.

5. The tire stud of claim 1 wherein the matrix material is a metal.

6. A tire stud consisting of a tubular rivet containing a plurality of relatively large irregularly shaped particles of sintered tungsten carbide abutting one another so that voids are formed between said plurality of particles and a plurality of irregularly shaped particles of sintered tungsten carbide of smaller average size disposed within the voids formed between the relatively large particles, both of said particles being disposed within a matrix of material having a lower melting point than said rivet.

7. The tire stud of claim 6 wherein the ratio between the average size of the relatively large average size particles and the substantially smaller average size particles exceeds two to one.

8. The tire stud of claim 6 wherein the average particle size of the relatively large particle size grit exceeds one-half the average cross-sectional dimension of the tube.

9. A tire stud including a cylindrical tube filled with a uniform dispersion of a plurality of regularly shaped particles of sintered tungsten carbide with an average maximum dimension in excess of the radius of the tube and a plurality of irregularly shaped particles of sintered tungsten carbide having an average particle size of less than one-third the average particle size of said relatively large particles disposed within the voids formed between the large particles, the voids in the skeleton thus formed being filled with a metal having a lower melting point than said tube.

* * * * *